US012698664B2

(12) United States Patent
Pedrosa Fernandez

(10) Patent No.: US 12,698,664 B2

(45) Date of Patent: Aug. 4, 2026

(54) FURNITURE DRIVE FOR MOVING A FURNITURE PART THAT IS MOVABLY MOUNTED RELATIVE TO A FURNITURE CARCASS

(71) Applicant: Julius Blum GmbH, Hoechst (AT)

(72) Inventor: Juan Jesus Pedrosa Fernandez, Dornbirn (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 18/916,170

(22) Filed: Oct. 15, 2024

(65) Prior Publication Data

US 2025/0034925 A1 Jan. 30, 2025

Related U.S. Application Data

(63) Continuation of application No. PCT/AT2023/060080, filed on Mar. 20, 2023.

(30) Foreign Application Priority Data

May 23, 2022 (AT) .............................. A 50086/2022

(51) Int. Cl.
*E05F 1/12* (2006.01)
*E05D 15/40* (2006.01)

(52) U.S. Cl.
CPC .............. *E05F 1/1261* (2013.01); *E05F 1/12* (2013.01); *E05D 15/401* (2013.01); *E05Y 2900/20* (2013.01)

(58) Field of Classification Search
CPC ........ E05D 15/401; E05F 1/12; E05F 1/1246; E05F 1/1253; E05F 1/1261; E05F 1/1269; E05F 1/1276; E05F 1/1292
See application file for complete search history.

(56) References Cited

U.S. PATENT DOCUMENTS 12,000,188 B2 * 6/2024 Schmid .................. E05D 15/40
12,129,700 B2 * 10/2024 Holzapfel .............. E05D 15/40
(Continued)

FOREIGN PATENT DOCUMENTS

AT 11 823 5/2011
AT 524391 5/2022
(Continued)

OTHER PUBLICATIONS

International Search Report issued May 31, 2023 in International (PCT) Application No. PCT/AT2023/060080.

*Primary Examiner* — Jeffrey O'Brien
(74) *Attorney, Agent, or Firm* — Wenderoth, Lind & Ponack, L.L.P.

(57) ABSTRACT

A furniture drive includes an adjustment device having a rotatably-supported adjustment element, a transmission mechanism for transmitting a force of the adjustment element, an overload safety device configured to couple the adjustment element with the transmission mechanism upon a rotation of the adjustment element with a torque below a predetermined limit torque. The overload safety device is further configured to decouple the adjustment element from the transmission mechanism upon a rotation of the adjustment element with a torque above the limit torque, preferably such that no torque transmission between the adjustment element and the transmission mechanism takes place. The overload safety device includes a first component having a longitudinal direction and a second component configured to be moved in a direction extending transversely to the longitudinal direction of the first component when the torque is above the limit torque.

24 Claims, 6 Drawing Sheets

(56) References Cited

U.S. PATENT DOCUMENTS

| | | | | |
|---|---|---|---|---|
| 2022/0056747 | A1 | 2/2022 | Holzapfel | |
| 2022/0074248 | A1* | 3/2022 | Holzapfel | E05D 3/16 |
| 2023/0272655 | A1* | 8/2023 | Baldreich | E05D 15/40<br>49/381 |

FOREIGN PATENT DOCUMENTS

| | | |
|---|---|---|
| EP | 2 248 981 | 11/2010 |
| EP | 3 708 753 | 9/2020 |
| WO | 2020/232483 | 11/2020 |
| WO | 2020/232485 | 11/2020 |
| WO | 2022/099334 | 5/2022 |

* cited by examiner

FURNITURE DRIVE FOR MOVING A FURNITURE PART THAT IS MOVABLY MOUNTED RELATIVE TO A FURNITURE CARCASS

BACKGROUND OF THE INVENTION

The present invention relates to a furniture drive for moving a furniture part movably-supported relative to a furniture carcass. The furniture drive Includes an adjustment device having at least one rotatably-supported adjustment element, a transmission mechanism for transmitting a force of the adjustment element, and at least one overload safety device configured to couple the adjustment element with the transmission mechanism upon a rotation of the adjustment element with a torque below a predetermined limit torque. The overload safety device is configured to decouple the adjustment element from the transmission mechanism upon a rotation of the adjustment element with a torque above the limit torque, preferably such that no torque transmission between the adjustment element and the transmission mechanism takes place.

Moreover, the invention concerns an item of furniture comprising a furniture carcass, a furniture part movably-supported relative to the furniture carcass, and a furniture drive of the type to be described.

AT 524391 A1 discloses a furniture drive comprising an actuating arm assembly for moving a movable furniture part, and an adjustment device for adjusting a force to the actuating arm assembly. The adjustment device includes a rotatable adjustment element, and a force of the spring device to the actuating arm assembly is adjustable by rotating the adjustment element. The furniture drive further includes an overload safety device configured to decouple the adjustment element from a transmission mechanism in the case when the adjustment element is rotated with a torque above a predetermined limit torque. This overload safety device is, in particular, useful when the adjustment element is driven with a high torque with the aid of a rotational tool in the form of a cordless screwdriver. The overload safety device includes a rotatable shaft having a first tooth arrangement which is pressed, by a force of a spring element, against a corresponding second tooth arrangement of the adjustment element in an axial direction of the shaft. A drawback is the fact that the manufacturing of the two tooth arrangements is relatively complicated. For a durable function of the overload safety device, the tooth arrangements shall consist of a metal which has to be milled and hardened. Moreover, the co-operating tooth arrangements only allow small tolerances and must be very precisely produced for this purpose. This leads, of course, also to increased costs in the serial production of the furniture drives.

Furniture drives with an overload safety device are also disclosed in EP 3 708 753 A1 and in WO 2020/232483 A1.

WO 2020/232485 A1 discloses a furniture drive for moving a movably-supported furniture flap, in which a housing of the furniture drive is configured to be integrated into a furniture panel of the furniture carcass.

SUMMARY OF THE INVENTION

It is an object of the present invention to propose a furniture drive mentioned in the introductory part, thereby avoiding the above-discussed drawbacks.

According to the invention, the overload safety device includes a first component having a longitudinal direction, and at least a second component. The second component is configured to be moved at least in a direction extending transversely to the longitudinal direction of the first component when the torque is above the limit torque.

In other words, the overload safety device includes at least two components movable relative to each other, the components being coupled in a first operating position in which a torque transmission between these components is established.

Upon a rotation of the adjustment element with a torque above the limit torque, the second component is movable in a direction extending transversely to the longitudinal direction of the first component (thus in a radial direction) into a second operating position, in which the two components are decoupled from each other such that no transmission of force takes place. This has the advantage that it is not necessary for the two components of the overload safety device to be pressed against each other in an axial direction by the spring element. Instead, the second component is deflected in a radial direction with respect to the longitudinal direction of the first component in an overload case.

The first component and the second component can be configured as components separate from each other, or can formed together so has to have an integral one-piece configuration. Preferably, the first component and the second component are connected to each other by at least one film hinge.

According to an embodiment, at least one holding element can be provided, the holding element being configured to hold the first component and the second component relative to each other in a coupling position when the torque is below the limit torque.

According to a further embodiment, the at least one holding element can include at least one spring element configured to apply a force to the second component in a direction of the first component.

The furniture drive can be utilized for driving movable furniture parts, in particular doors, flaps or drawers, or also for driving other movable elements, such as windows for example.

BRIEF DESCRIPTION OF THE DRAWINGS

Further details and advantages of the present invention will be explained with the aid of the following description of figures, in which.

DETAILED DESCRIPTION OF THE INVENTION

Figure 1A:
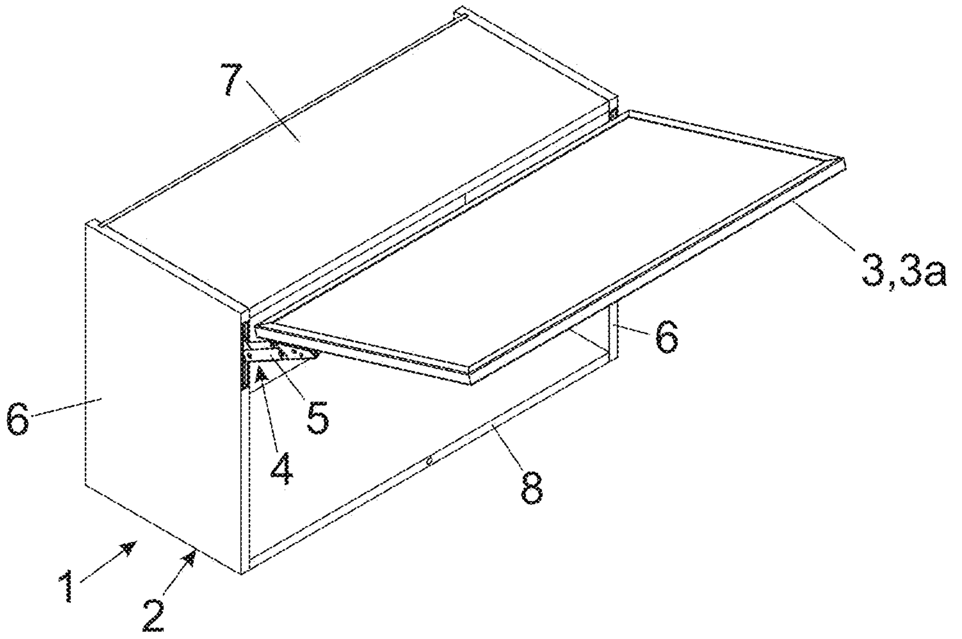
FIG. 1*a*, 1*b* show an item of furniture comprising a movable furniture part in a perspective view and in an exploded view.

FIG. 1*a* shows a perspective view of an item of item of furniture 1 comprising a furniture carcass 2, a furniture part 3 movably-supported relative to the furniture carcass 2, and at least one furniture drive 4 for moving the movable furniture part 3. The item of furniture 1 includes furniture panels 6 in the form of sidewalls, a top panel 7 and a bottom panel 8. In the shown embodiment, the furniture part 3 is in the form of a furniture flap 3*a* configured to be lifted relative to the furniture carcass 2.

In the shown embodiment, the furniture drive 4 is at least partially, preferably substantially entirely, integrated into a furniture panel 6 of the furniture carcass 2. Of course, the furniture drive 4 can also be arranged outside a wall thickness of the furniture panel 6.

The movable furniture part 3 is movably supported relative to the furniture carcass 2 between a closed position in which the furniture carcass 2 is covered, and an elevated open position.

Of course, it is also possible to integrate the furniture drive 4 into a horizontally extending furniture panel, thus for example into the top panel 7, into the bottom panel 8 and/or into a shelf arranged between the top panel 7 and the bottom panel 8. In such a case, the movable furniture part 3 is pivotally supported about a vertically extending axis relative to the furniture carcass 2 in a mounted position.

The furniture drive 4 includes an actuating arm assembly 5 for moving the movable furniture part 3, and at least one spring device 10 (FIG. 1*b*) configured to apply a force to the actuating arm assembly 5.

Figure 1B:
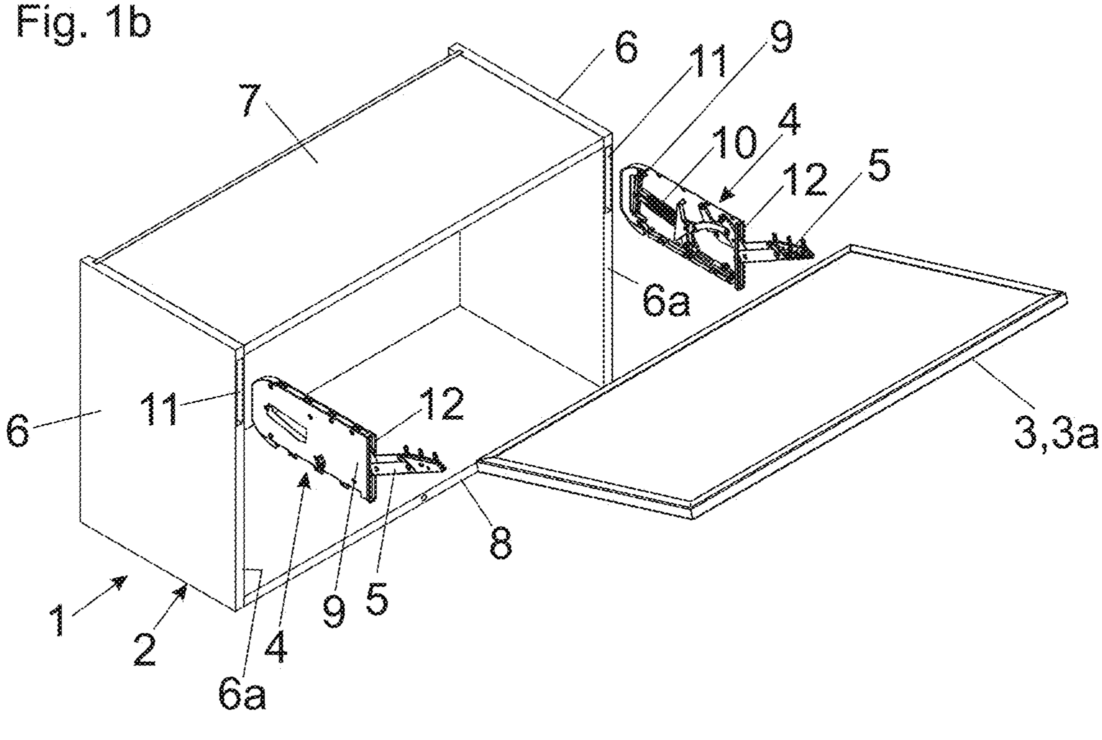

FIG. 1*b* shows the item of furniture 1 in an exploded view, in which two furniture drives 4, preferably identical in construction, are provided for moving the movable furniture part 3. Each of the furniture drives 4 includes a housing 9 configured to be fixed to the furniture carcass 2.

According to an embodiment, the housing 9 is at least partially, preferably substantially entirely, received within a recess 11 of the furniture panels 6 configured as sidewalls in a mounted condition. In a mounted condition, the housing 9 can be arranged substantially flush with a front face 6*a* of the furniture panel 6.

For example, the recess 11 can be in the form of a blind hole, and the housing 9 is insertable from the front when being mounted (that is to say from the narrow front face 6*a* of the furniture panel 6) into the pocket-shaped recess 11 of the furniture panel 6.

A cover 12 is provided on the front-end region of the housing 9, and at least one movably-supported actuating arm 5*a*, 5*b*, 5*c*, 5*d*, 5*e* (FIG. 2*a*) of the actuating arm assembly 5 can be guided through the cover 12 in a relative position.

Figure 2A:
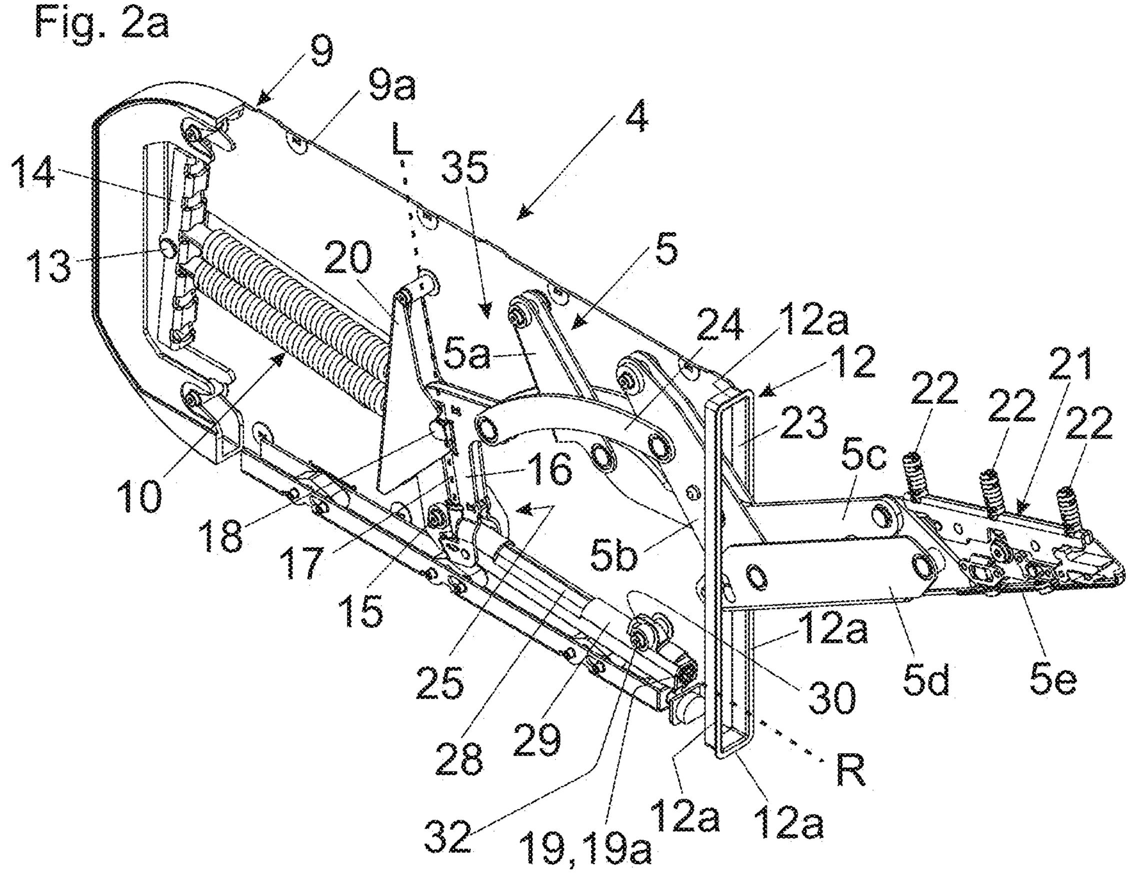
FIG. 2*a*, 2*b* show a furniture drive in two different perspective views.

FIG. 2*a* shows the furniture drive 4 in a perspective view, in which the housing 9 includes at least one flat-shaped housing wall 9*a* configured to bear against the furniture carcass 2. A pivotable bearing portion 14 is provided on the housing wall 9*a*, the bearing portion 14 being pivotally supported about a hinge axis 13 stationarily arranged on the housing 9. A first end region of the spring device 10 is thus supportable on the stationary hinge axis 13. The spring device 10 can include at least one helical spring, preferably at least one compression spring, or, alternatively, a gas pressure spring.

The furniture drive 4 includes a transmission mechanism 35 which, for example, can be provided for transmitting a force from the spring device 10 to the actuating arm assembly 5.

In the shown embodiment, a second end region of the spring device 10 operates on a pressure portion 20. The pressure portion 20 is hingedly connected via an adjustable engagement location 18 to an intermediate lever 16 pivotable about a, preferably stationary, hinge axis 15.

By an adjustment device 19, a force of the spring device 10 to the actuating arm assembly 5 is adjustable. The adjustment device 19 includes an adjustment element 19*a* rotatable about a rotational axis R. A position of the engagement location 18 of the spring device 10 relative to the actuating arm assembly 5 is adjustable, preferably along a threaded portion 17, by rotating the adjustment element 19*a* about the rotational axis R.

The threaded portion 17 has a longitudinal axis L. The angle, that the longitudinal axis L of the threaded portion 17 and the rotational axis R of the adjustment element 19*a* enclose relative to each other, can be varied upon a movement of the actuating arm assembly 5. By an angularly-movable coupling device 25, a rotational movement of the adjustment element 19*a* can be transmitted to the threaded portion 17. As a result, the threaded portion 17 can be set into a rotational movement and thus the engagement location 18 is movable along the threaded portion 17.

The angularly-movable coupling device 25 can include at least one elastic element, preferably a folding bellows, a rubber form element, a coil spring coupling, and/or at least one gear, preferably a bevel gear transmission, and/or a joint, preferably a cross-joint or a cardan joint. Due to the angularly-movable coupling device 25, a very compact arrangement can be made possible, because the components of the furniture drive 4 can be nested into each other.

Preferably, the adjustment element 19*a* of the adjustment device 19, in a mounted condition of the furniture drive 4, faces towards the movable furniture part 3 and is arranged in a front-end region of the housing 9. In this way, the adjustment element 19*a* can be comfortably actuated from the front with the aid of a tool.

In the shown embodiment, at least one shaft 28 for driving the threaded portion 17 is provided, the at least one shaft 28 being configured to be driven by the adjustment element 19*a*. The at least one shaft 28 is displaceably supported relative to the housing 9 in or along a guide 30, preferably an elongated hole. In this way, compensation movements of components of the furniture drive 4, caused by the angularly-movable coupling device 25, can be at least partially compensated for.

The shaft 28 is arranged in or on a bearing device 29. The guide 30 is arranged on the bearing device 29, and a pin 32 stationarily supported on the housing 9 engages into the guide 30 of the bearing device 29. Upon a compensation movement, the bearing device 29 is movable relative to the stationary pin 32.

The actuating arm assembly 5 includes at least one actuating arm 5*a*, 5*b*, 5*c*, 5*d*, 5*e*, preferably a plurality of actuating arms 5*a*, 5*b*, 5*c*, 5*d*, 5*e*, for moving the movable furniture part 3. A fitting portion 21 is to be fixed to the movable furniture part 3, the fitting portion 21 having at least one or a plurality of fastening locations 22 and being configured to be releasably locked to an actuating arm 5*e* of the actuating arm assembly 5. In FIG. 2*a*, the locked condition between the actuating arm 5*e* and the fitting portion 21 is shown.

A cover 12 is provided on the front-end of the housing wall 9*a*, the cover 12 having at least one laterally protruding flange 12*a*. In the shown embodiment, the flange 12*a* is substantially ring-shaped and forms a depth stop for the housing 9, the depth stop being configured to bear against the front face 6*a* of the furniture panel 6.

Figure 2B:
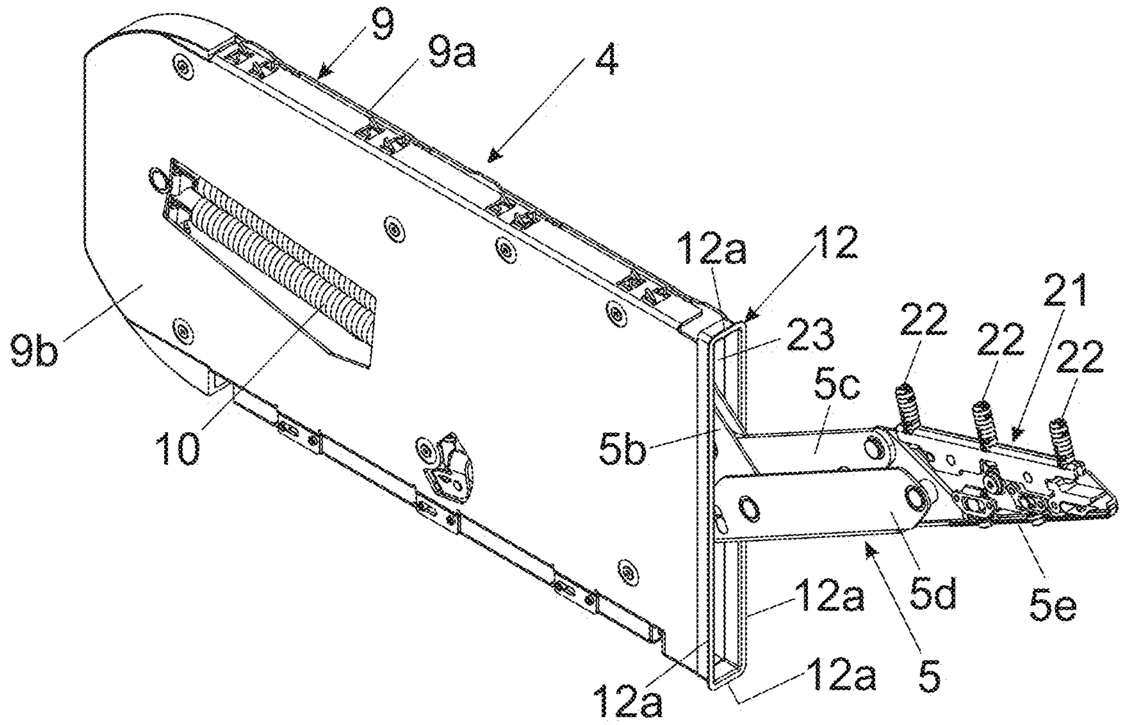

FIG. 2*b* shows the furniture drive 4 according to FIG. 2*a*, in which the housing 9 is closed by the second housing wall 9*b*. The first housing wall 9*a* and the second housing wall 9*b* are each flat and jointly form a substantially cuboidal housing 9. The housing walls 9_a_, 9_b_ are spaced apart from each other in a parallel relationship, and a front-sided opening 23 is formed between the housing walls 9_a_, 9_b_.

The cover 12 is arranged adjacent to the opening 23 and allows the passage of a screwdriver for the adjustment device 19 to be actuated.

Figure 3A:
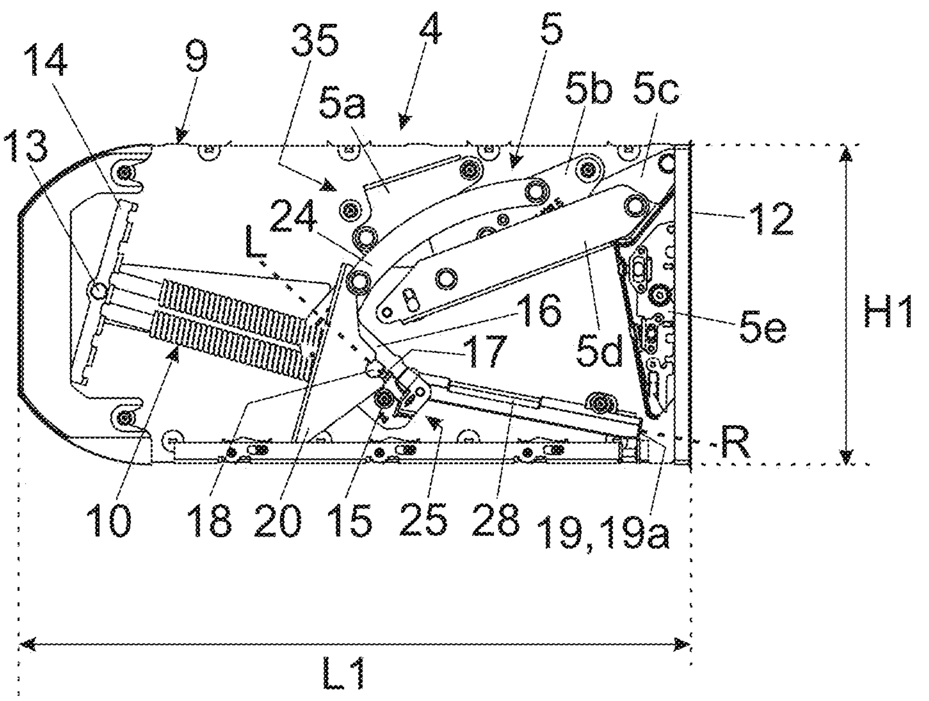
FIG. 3*a*, 3*b* show the furniture drive in a closed position and in an open position.
Figure 3B:
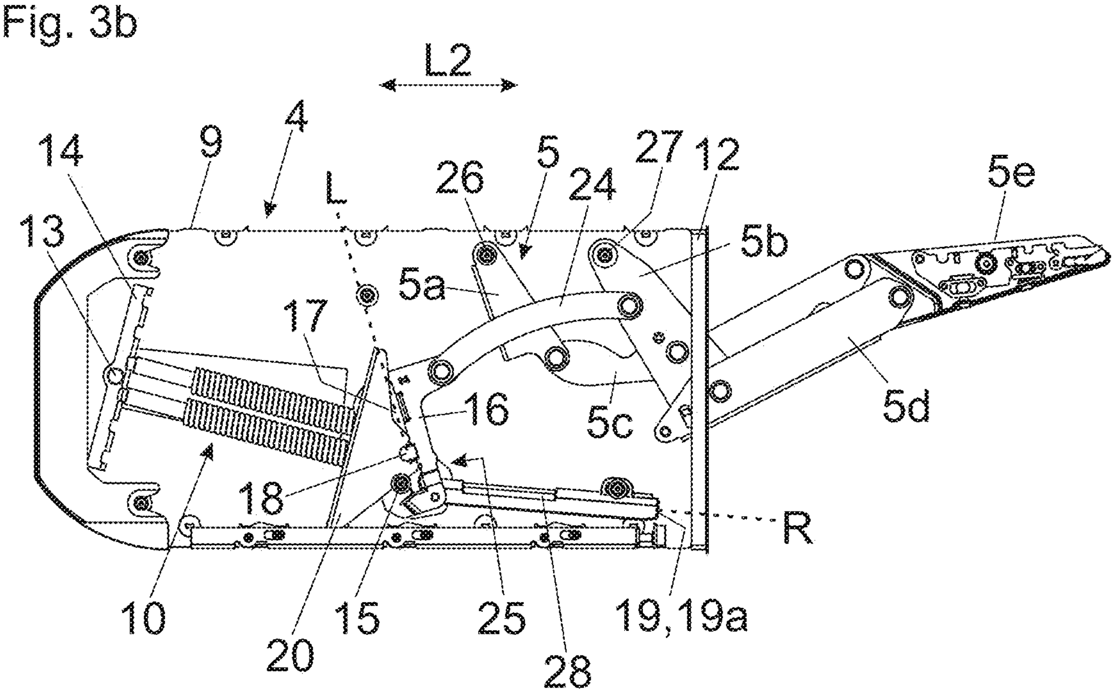

FIG. 3_a_ shows the furniture drive 4 with the housing 9 in a side view. The threaded portion 17 is arranged on an intermediate lever 16, the intermediate lever 16 being pivotally supported about a stationary hinge axis 15 on the housing 9. In the shown figure, the spring device 10 applies a minimum torque to the actuating arm assembly 5, because the engagement location 18 of the spring device 10 is located adjacent to the hinge axis 15 of the intermediate lever 16. A notional connecting line between the hinge axis 15 of the intermediate lever 16 and the engagement location 18 of the spring device 10 forms a relatively short lever arm. Therefore, a minimum torque acts on the actuating arm assembly 5.

The rotational axis R of the adjustment element 19_a_ of the adjustment device 19 and the longitudinal direction L of the threaded portion 17 enclose an angle relative to each other, the angle being variable upon a movement of the actuating arm assembly 5. An advantage of this construction can be seen with the aid of FIG. 3_a_, because in the shown closed position of the furniture drive 4, due to the angularly-movable arrangement of the rotational axis R and the longitudinal direction L, the actuating arms 5_a_-5_e_ of the actuating arm assembly 5, jointly with the spring device 10 and the adjustment device 19, can achieve a very compact position relative to each other.

The adjustment element 19_a_ and the rotatable threaded portion 17 are thus angularly-movably supported relative to each other upon a movement of the actuating arm assembly 5. As a result, the adjustment device 19 for adjusting a force of the spring device 10 and the actuating arm assembly 5 can achieve different positions to each other. The components of the furniture drive 4 can be nested into each other and, therefore, can be arranged tighter to each other. In this way, the furniture drive 4 can be designed in a more compact manner, the adjustment path of the spring device 10 along the threaded portion 17 can be increased, and higher performance ranges of the furniture drive 4 can be provided.

The housing 9 can be substantially cuboidal. Preferably, a ratio of a length L1 of the housing 9 to a height H1 of the housing 9 is larger than 1 to 0.7, preferably larger than 1 to 0.5. Due to such a dimensioning, a reduced height H1 of the housing 9 can be provided. In this way, the height of the recess 11 (FIG. 1_b_) of the furniture panel 6 can also be kept small, and the manufacturing efforts for producing the recess 11 and a weakening of the furniture panel 6 are minor.

FIG. 3_b_ shows the furniture drive 4 according to FIG. 3_a_ with a minimum force adjustment of the spring device 10, in which the actuating arm assembly 5 with the actuating arms 5_a_-5_e_ is located in an open position. It is evident that the angle, that the rotational axis R and the longitudinal direction L of the threaded portion 17 enclose to each other, has been decreased with respect to the closed position shown in FIG. 3_a_.

The actuating arm assembly 5 includes a first actuating arm 5_a_ pivotable about a first hinge axis 26, and at least one second actuating arm 5_b_ pivotably supported about a second hinge axis 27. The first hinge axis 26 and the second hinge axis 27 are spaced apart from each other along a longitudinal direction L2 of the housing 9, and the second hinge axis 27 is arranged in a front region of the housing 9 with respect to the first hinge axis 26.

The intermediate lever 16 is directly connected to the second (frontal) actuating arm 5_b_ via a, preferably curved-shaped, pushing lever 24. The first actuating arm 5_a_ is thus not directly connected to the pushing lever 24 via a hinge axis. Instead, the first actuating arm 5_a_ is displaceably guided within the pushing lever 24. This can be well seen in FIG. 2_a_. In this way, an improved and direct introduction of force of the spring device 19 into the actuating arm assembly 5 can be provided.

Figure 4A:
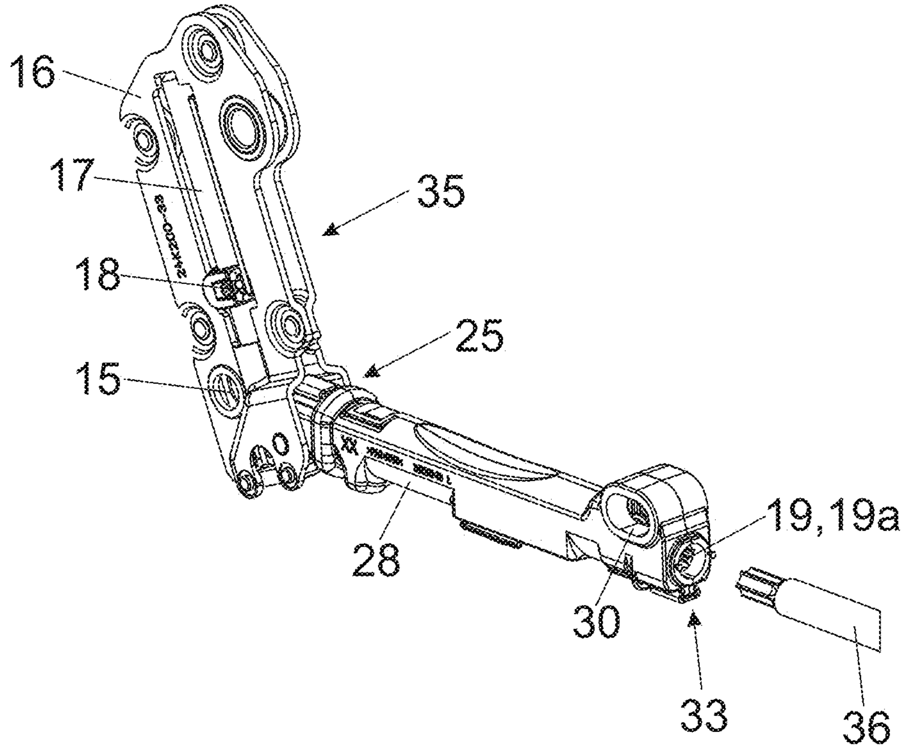
FIG. 4*a*, 4*b* show an adjustment device with an overload safety device in two different views.
Figure 4B:
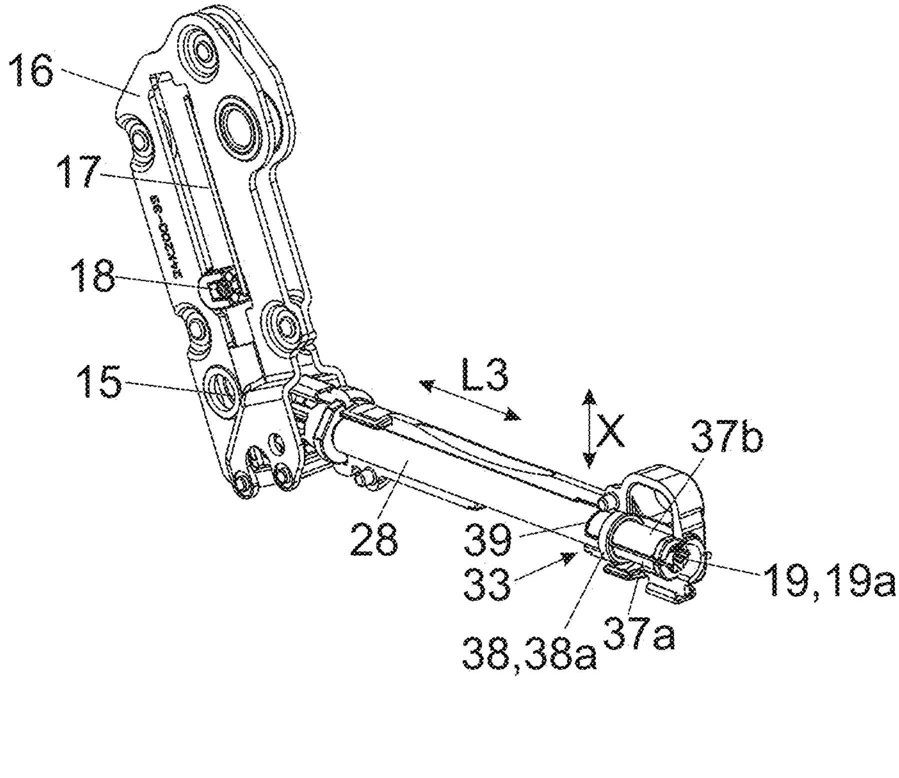

FIG. 4_a_ shows the adjustment device 19 with the rotatable adjustment element 19_a_ and an overload safety device 33. The overload safety device 33 is configured such that upon a movement of the adjustment element 19_a_ with a torque below a predetermined limit torque, the adjustment element 19_a_ is coupled to the transmission mechanism 35. Upon a rotation of the adjustment element 19_a_ with a torque above a predetermined limit torque, the adjustment element 19_a_ can be decoupled from the transmission mechanism 35 by virtue of the overload safety device 33.

By a rotational tool 36, for example a cordless screwdriver, the adjustment element 19_a_ can be driven. The rotational movement of the adjustment element 19_a_ can be transmitted to the shaft 28, and the threaded portion 17 can be set into a rotational movement via the angularly-movable coupling device 25. As a result, the engagement location 18 of the spring device 10 is movable along the threaded portion 17. In the shown embodiment, the threaded portion 17 is supported on the intermediate lever 16 pivotable about the hinge axis 15.

FIG. 4_b_ shows the view according to FIG. 4_a_, in which a housing portion is not depicted so as to illustrate the overload safety device 33 in greater detail. The overload safety device 33 includes a first component 37_a_ having a longitudinal direction L3 and a second component 37_b_. The components 37_a_, 37_b_ are movable relative to each other between a coupling position and a decoupling position.

Upon rotating the adjustment element 19_a_ with a torque below a predetermined limit torque, the adjustment element 19_a_ is coupled to the transmission mechanism 35.

Upon rotating the adjustment element 19_a_ with a torque above the predetermined limit torque, the adjustment element 19_a_ can be decoupled from the transmission mechanism 35, namely in that the second component 37_b_ is movable relative to the first component 37_a_ at least in a direction X extending transversely to the longitudinal direction L3 of the first component 37_a_.

According to possible embodiments, the first component 37_a_ and/or the second component 37_b_

- is or are substantially cylindrical at least over a region, and/or
- collectively form a substantially cylindrical shape, and/or
- is or are made of plastic, and/or
- is or are produced by an injection molding process.

The two components 37_a_, 37_b_ can be configured as components 37_a_, 37_b_ separate from each other. According to an alternative embodiment, the two components 37_a_, 37_b_ can be connected to each other via at least one film hinge 39.

In the shown embodiment, at least one holding element 38 is provided, the holding element 38 being configured to hold the first component 37_a_ and the second component 37_b_ relative to each other in a coupling position when the torque is below the limit torque.

The at least one holding element 38 can include at least one spring element 38_a_ for pressurizing the second component 37_b_ with a force in a direction of the first component 37_a_. Preferably, the spring element 38_a:_ is ring-shaped at least over a region (i.e., at least partially), and/or is configured as an O-ring, and/or is hollow-cylindrical at least over a region, and/or has a width between 0.1 mm and 3.0 mm, preferably a width of 2.0 mm, and/or has a wall thickness between 0.1 mm and 2.0 mm, preferably a wall thickness of 1.0 mm, and/or has an outer diameter of less than 8.0 mm, preferably of less than 7.5 mm, particularly preferably of less or equal than 7.0 mm, and/or consists of plastic, preferably POM and/or TPU, and/or is produced by an injection molding process, and/or is configured to be, preferably elastically, widened at least partially in a radial direction.

In the shown embodiment, the first component 37*a* of the overload safety device 33 and the shaft 28 are formed together so as to have an integral one-piece configuration. However, the component 37*a* and the shaft 28 can also be configured as components separate from each other.

The adjustment element 19*a* of the adjustment device 19 and at least one component 37*a*, 37*b*, preferably both components 37*a*, 37*b*, can be formed together so as to have an integral one-piece configuration. As a result, the arrangement of an adjustment element 19*a* separate from the components 37*a*, 37*b* can be omitted. Of course, an adjustment element 19*a* separate from the components 37*a*, 37*b* may also be provided.

According to an embodiment, the holding element 38 is displaceably supported relative to the first component 37*a* and/or relative to the second component 37*b* at least over a region in a direction extending in the longitudinal direction L3 of the first component 37*a*. Preferably, the limit torque is adjustable by a displacement of the holding element 38.

According to an embodiment, the limit torque is between 0.5 Nm and 4.0 Nm, preferably between 0.8 Nm and 1.2 Nm.

FIG. 5*a*-5*d* show the overload safety device 33 in different views.

Figure 5A:
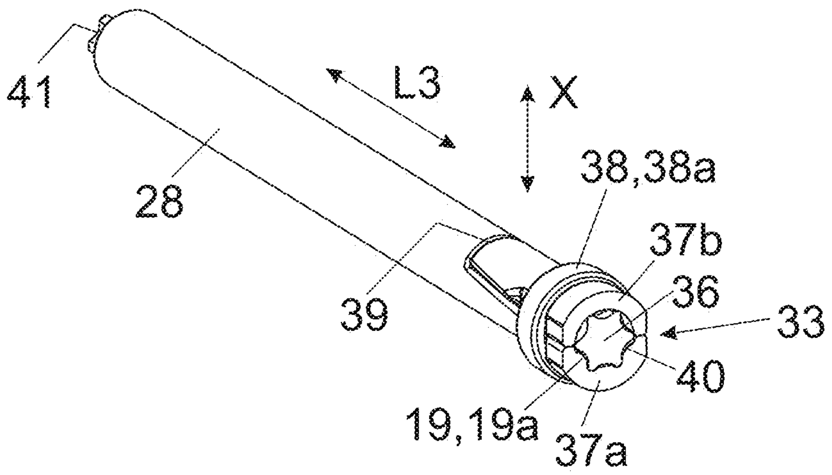
FIG. 5*a*-5*d* show different views of the overload safety device in a coupling position.

FIG. 5*a* shows a perspective view of the two components 37*a*, 37*b* of the overload safety device 33, in which the rotational tool 36 is introduced into the two components 37*a*, 37*b*. By rotating the rotational tool 36, at least one of the two components 37*a*, 37*b* can be driven.

The first component 37*a* and the shaft 28 can be formed together so as to have an integral one-piece configuration. Alternatively, it is also possible that the first component 37*a* and the shaft 28 are configured as elements separate from each other.

The first component 37*a* can include at least one tooth arrangement 41 configured to transmit a rotational movement of the first component 37*a* to the other components of the transmission mechanism 35 of the furniture drive 4.

The first component 37*a* and the second component 37*b* can be configured as components 37*a*, 37*b* separate from each other. Alternatively, it is also possible that the first component 37*a* and the second component 37*b* are formed together so as to have an integral one-piece configuration.

For example, the first component 37*a* and the second component 37*b* are connected to each other via at least one film hinge 39.

Due to the holding element 38, the two components 37*a*, 37*b* can be held in coupling position relative to each other so as to transmit a torque to the shaft 28, when the torque is below the limit torque.

The adjustment element 19*a* of the adjustment device 19 can include at least one actuating contour 40. Preferably, the actuating contour 40:

includes at least partially a hexagon-profile, and/or has a diameter of less or equal than 3.86 mm, and/or is only arranged on the first component 37*a*, and/or is at least partially arranged on the first component 37*a* and at least partially on the second component 37*b*, and/or is arranged on a front face of the adjustment element 19*a*.

Figure 5B:
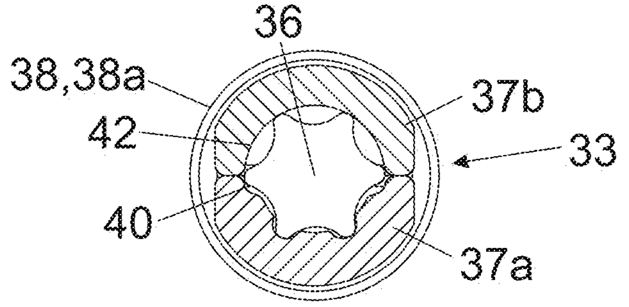

FIG. 5*b* shows the embodiment of the overload safety device 33 according to FIG. 5*a* in a cross-sectional view. To be seen is the rotational tool 36 introduced into the two components 37*a*, 37*b*. Here, only the first component 37*a* includes an actuating contour 40 for the rotational tool 36. On the contrary, the second component 37*b* includes a circular inner contour 42. Accordingly, a rotational movement of the rotational tool 36 is only transmitted to the first component 37*a*. In this way, a lesser torque can be transmitted, so that the limit torque of the overload safety device 33 can be reduced for different applications.

Figure 5C:
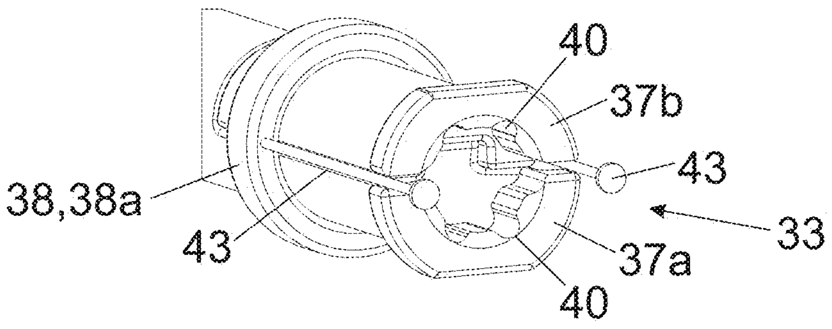

FIG. 5*c* shows an embodiment of an overload safety device 33, in which the holding element 38 is located in a rear-end position relative to the two components 37*a*, 37*b*.

The holding element 38 can be displaceable relative to the first component 37*a* and/or relative to the second component 37*b* by at least one actuating device 43. In this way, the limit torque of the overload safety device 33 is adjustable.

According to possible embodiments:

the at least one actuating device 43 is configured to be actuated from a direction extending parallel and/or transversely to the longitudinal direction L3 of the first component 37*a*, and/or the furniture drive 4 includes a housing 9, and the overload safety device 33 is arranged in the housing 9 and the holding element 38 is configured to be actuated from an external side of the housing 9 via the actuating device 43.

Preferably, the holding element 38 is accessible for manual actuation via the actuating device 43 from the front face of the furniture panel 6 when the furniture drive 4 is arranged on or within the furniture panel 6.

For example, the actuating device 43 can include a displaceable and/or a pivotable actuating element configured to adjust a position of the holding element 38. For example, the actuating element of the actuating device 43 can be arranged on the housing 9 of the furniture drive 4, preferably on the frontal front face of the housing 9.

Figure 5D:
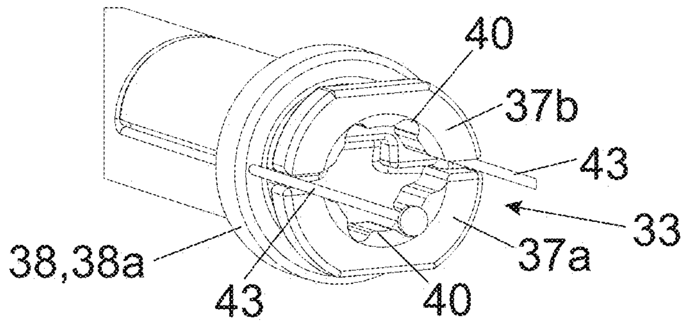

FIG. 5*d* shows the embodiment of the overload safety device 33 according to FIG. 5*c*, in which the holding element 38, preferably in the form of the spring element 38*a*, is located in a frontal end position relative to the two components 37*a*, 37*b*. In the position according to FIG. 5*d*, a higher torque can be transmitted in a direct comparison with FIG. 5*c*.

Figure 6A:
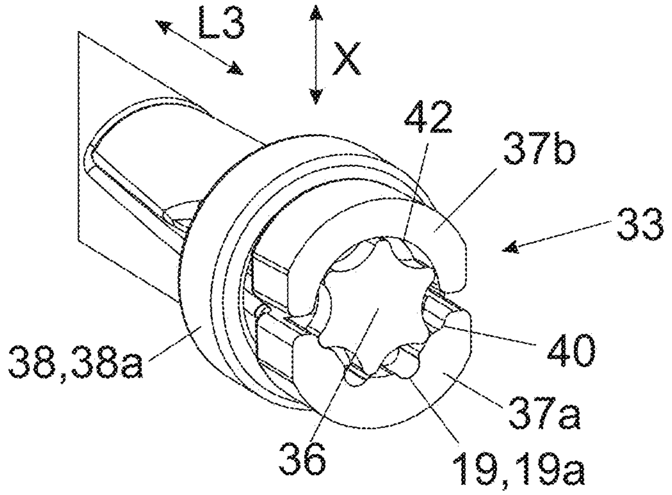
FIG. 6*a*-6*c* show different views of the overload safety device in a decoupling position, and the overload safety device in an exploded view.

FIG. 6*a* shows a perspective view of the overload safety device 33 in a decoupling position, in which the transmission of torque is interrupted. It can be seen that the rotational tool 36 is introduced into the two components 37*a*, 37*b*, the rotational tool 36 being rotated here with a torque above the predetermined limit torque.

In this case, the rotational tool 36 slips from the actuating contour 40 of the first component 37*a*, and the protrusions of the rotational tool 36 are no longer in engagement with the corresponding recesses of the actuating contour 40. After the release of a holding force predetermined by the holding element 38, the second component 37*b* is lifted from the first component 37*a* in the direction X so as to interrupt the transmission of a torque.

The first component 37*a* and the second component 37*b* are arranged in a coupling position relative to each other when the torque is below the limit torque, and are arranged in a decoupling position relative to each other when the torque is above the limit torque. In the decoupling position, the two components 37*a*, 37*a* are further spaced apart from each other along a direction X extending transversely to the longitudinal direction L3 of the first component 37*a* than in the coupling position.

Figure 6B:
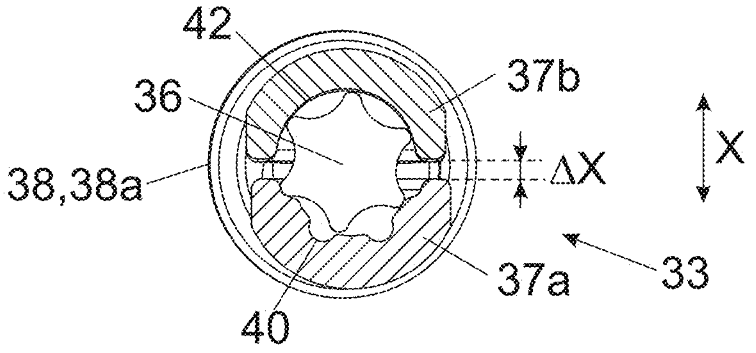

FIG. 6*b* shows the overload safety device 33 according to FIG. 6*a* in a cross-sectional view. It can be seen that the second component 37*b* has been moved, under the formation of a gap, by the differential amount ΔX relative to the first component 37*a* in a direction X extending transversely to the longitudinal direction L3 of the first component 37*a*, when the admissible limit torque is exceeded, and the rotational tool 36 is no longer in engagement with the actuating contour 40 of the first component 37*a*.

Figure 6C:
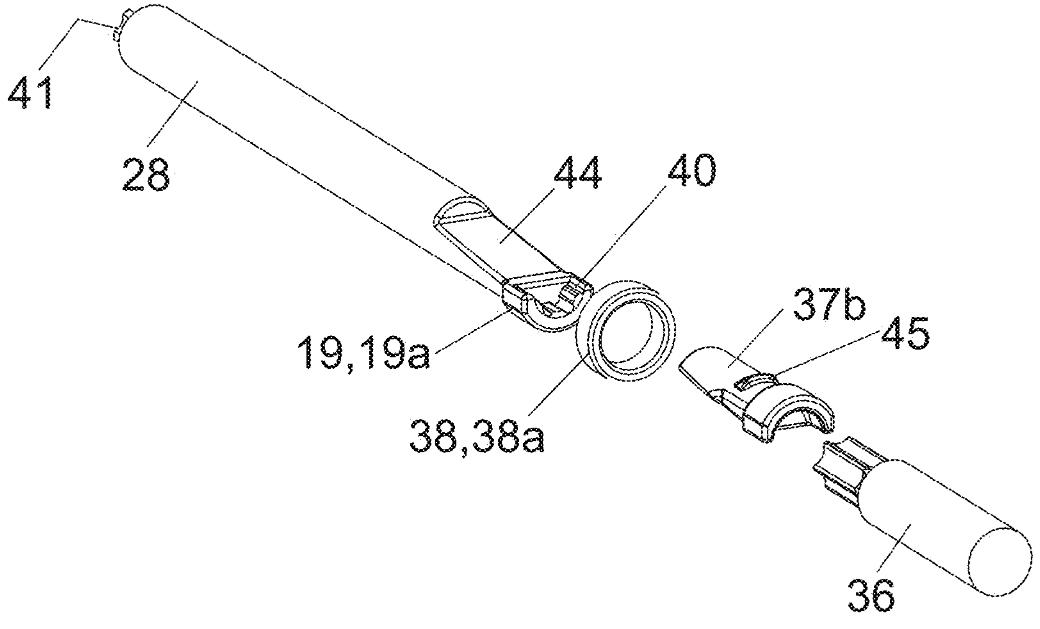

FIG. 6*c* shows the overload safety device 33 in an exploded view. The first component 37*a* can include at least one recess 44 in which the second component 37*b* can be at least partially arranged. However, the arrangement of a film hinge 39 for hingedly connecting the two components 37*a*, 37*b* can be basically omitted.

At least one abutment element 45 can be arranged on the first component 37*a* and/or on the second component 37*b*, the at least one abutment element 45 being configured to limit a movement of the holding element 38 in the longitudinal direction L3 of the first component 37*a*.

The invention claimed is:

1. A furniture drive for moving a furniture part movably-supported relative to a furniture carcass, the furniture drive comprising:

an adjustment device having at least one rotatably-supported adjustment element configured to be rotated by a tool;

a transmission for transmitting a force of the adjustment element; and an overload safety device configured to allow the adjustment element to rotate and thereby transmit the force of the adjustment element to the transmission upon a torque below a predetermined limit torque being applied to the adjustment element with the tool, and being configured to prevent the adjustment element from being rotated by the tool upon a torque above the limit torque being applied to the adjustment element with the tool, wherein the overload safety device includes:

a first component having a longitudinal direction;

a second component; and a holding element configured to hold the first component and the second component relative to each other in a coupled position when the torque applied to the adjustment element is below the limit torque, wherein the second component is configured to be moved relative to the first component at least in a direction extending transversely to the longitudinal direction of the first component so as to decouple the first component and the second component from each other when the torque applied to the adjustment element is above the limit torque.

2. The furniture drive according to claim 1, wherein:

the first component or the second component is at least partially cylindrical; or the first component and the second component collectively form a cylindrical shape; or the first component or the second component is made of plastic; or the first component or the second component is produced by an injection-molding process.

3. The furniture drive according to claim 1, wherein the first component includes at least one recess configured to at least partially receive the second component.

4. The furniture drive according to claim 1, wherein the first component and the second component are configured as components separate from each other, or are formed together so as to have an integral one-piece configuration.

5. The furniture drive according to claim 1, wherein at least one abutment is arranged on the first component or on the second component, the at least one abutment being configured to limit a movement of the holding element in the longitudinal direction of the first component.

6. The furniture drive according to claim 5, wherein the holding element includes at least one spring configured to pressurize the second component in a direction of the first component.

7. The furniture drive according to claim 5, wherein the holding element is at least partially displaceably supported in the longitudinal direction of the first component relative to the first component or relative to the second component.

8. The furniture drive according to claim 7, further comprising an actuator for displacing the holding element relative to the first component or relative to the second component.

9. The furniture drive according to claim 1, wherein the overload safety device is configured such that the limit torque is between 0.5 Nm and 4.0 Nm.

10. The furniture drive according to claim 1, wherein the first component and the second component are arranged relative to each other in the coupled position when the torque is below the limit torque, and are arranged in a decoupled position when the torque is above the limit torque, and wherein the first and second components, in the decoupled position, are further spaced apart from each other in a direction extending transversely to the longitudinal direction of the first component than in the coupled position.

11. The furniture drive according to claim 1, wherein the adjustment element and the first component or the second component are formed together so as to have an integral one-piece configuration, or wherein the adjustment element and the first and second components are separate from each other.

12. The furniture drive according to claim 1, wherein the adjustment element includes an actuating contour.

13. The furniture drive according to claim 1, wherein the furniture drive:

includes an actuating arm assembly having at least one movably-supported actuating arm for moving the movable furniture part;

includes a spring for applying a force to the actuating arm assembly, wherein the spring is connected to the actuating arm assembly via an engagement location; and wherein upon a rotation of the adjustment element, a relative position of the engagement location with respect to the actuating arm assembly is adjustable.

14. The furniture drive according to claim 13, further comprising a threaded portion having a longitudinal direction, wherein the engagement location of the spring along the threaded portion is adjustable by rotating the adjustment element about a rotational axis.

15. An item of furniture comprising:

a furniture carcass;

a furniture part movably-supported relative to the furniture carcass; and the furniture drive according to claim 1 for moving the movable furniture part.

16. The furniture drive according to claim 4, wherein the first component and the second component are connected to each other via at least one film hinge.

17. The furniture drive according to claim 6, wherein the at least one spring:

is at least partially ring-shaped; or is configured as an O-ring; or is at least partially hollow cylindrical;

has a width between 0.1 mm and 3.0 mm; or has a wall thickness between 0.1 mm and 2.0 mm; or has an outer diameter of less than 8.0 mm; or consists of plastic; or is produced by an injection molding process; or is configured to be at least partially widened in a radial direction.

18. The furniture drive according to claim 17, wherein the at least one spring:

has a width of 2.0 mm; or has a wall thickness of 1.0 mm; or has an outer diameter of less than or equal to 7.0 mm; or consists of plastic, and the plastic is polyoxymethylene (POM) or thermoplastic polyurethane (TPU); or is configured to be at least partially elastically widened in a radial direction.

19. The furniture drive according to claim 7, wherein the limit torque is adjustable by a displacement of the holding element.

20. The furniture drive according to claim 8, wherein:

the actuator is configured to be actuated from a direction extending parallel or transversely to the longitudinal direction of the first component, or the furniture drive includes a housing, wherein the overload safety device is arranged in the housing, and the holding element is configured to be actuated from an external side of the housing via the actuator.

21. The furniture drive according to claim 9, wherein the overload safety device is configured such that the limit torque is between 0.8 Nm and 1.2 Nm.

22. The furniture drive according to claim 12, wherein the actuating contour:

includes at least partially a hexagon-profile; or has a diameter of less than or equal to 3.86 mm; or is only arranged on the first component; or is at least partially arranged on the first component and at least partially on the second component; or is arranged on a front face of the adjustment element.

23. The furniture drive according to claim 14, wherein the rotational axis of the adjustment element and the longitudinal direction of the threaded portion form an angle relative to each other, and wherein the furniture drive includes an angularly-movable coupling device configured to vary the angle upon a movement of the actuating arm assembly.

24. The item of furniture according to claim 15, wherein the furniture carcass includes a furniture panel for fixing a housing of the furniture drive, wherein the housing of the furniture drive is at least partially received within a recess of the furniture panel.

* * * * *